United States Patent
Wallis et al.

(10) Patent No.: US 9,711,973 B2
(45) Date of Patent: Jul. 18, 2017

(54) WIRELESS POWER TRANSFER USING A MICROWAVE SIGNAL

(71) Applicant: MOTOROLA SOLUTIONS, INC., Schaumburg, IL (US)

(72) Inventors: David Wallis, Atlanta, GA (US); John Herrmann, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 136 days.

(21) Appl. No.: 14/696,082

(22) Filed: Apr. 24, 2015

(65) Prior Publication Data
US 2016/0315480 A1    Oct. 27, 2016

(51) Int. Cl.
| H01F 27/42 | (2006.01) |
| H01F 37/00 | (2006.01) |
| H01F 38/00 | (2006.01) |
| H02J 5/00 | (2016.01) |
| H02J 50/20 | (2016.01) |
| H01F 38/14 | (2006.01) |

(52) U.S. Cl.
CPC .............. *H02J 5/005* (2013.01); *H01F 38/14* (2013.01); *H02J 50/20* (2016.02); *H01F 2038/143* (2013.01)

(58) Field of Classification Search
CPC .. H02J 5/005; H02J 7/025; H02J 17/00; H02J 50/12; H02J 50/10; H02J 50/80; H02J 50/90; H02J 50/60; H02J 50/40; H02J 50/20; H02J 2007/0096; H02J 50/50; H02J 7/0042; H02J 7/0054; H02J 50/00
See application file for complete search history.

(56) References Cited

U.S. PATENT DOCUMENTS

| 5,535,438 A * | 7/1996 | Sevic ................... H03F 3/2176 330/207 A |
| 6,127,799 A | 10/2000 | Krishnan |
| 6,380,802 B1 * | 4/2002 | Pehike ..................... H03C 5/00 330/10 |
| 6,794,951 B2 * | 9/2004 | Finley ................... H03H 11/28 333/17.3 |
| 6,967,462 B1 | 11/2005 | Landis |
| 8,159,364 B2 | 4/2012 | Zeine |
| 8,410,953 B2 | 4/2013 | Zeine |
| 8,446,248 B2 | 5/2013 | Zeine |
| 8,558,661 B2 | 10/2013 | Zeine |

(Continued)

OTHER PUBLICATIONS

PCT/US2016/025312 International Search Report and Written Opinion of the International Searching Authority dated May 23, 2016 (10 Pages).

*Primary Examiner* — Jared Fureman
*Assistant Examiner* — Esayas Yeshaw
(74) *Attorney, Agent, or Firm* — Michael Best & Friedrich LLP (57) ABSTRACT

A wireless power source including a microwave receiver, a matching network, and a transducer. The microwave receiver receives a microwave signal having a carrier frequency. The matching network receives a signal having the carrier frequency and a switched frequency and removes the carrier frequency such that the matching network outputs a switched signal at the switched frequency. The transducer is configured to receive the switched signal and output a DC voltage.

13 Claims, 7 Drawing Sheets

(56) References Cited

U.S. PATENT DOCUMENTS

| | | | |
|---|---|---|---|
| 8,643,433 B2* | 2/2014 | Ho | H03F 1/0277 |
| | | | 330/151 |
| 8,854,176 B2 | 10/2014 | Zeine | |
| 2002/0160722 A1* | 10/2002 | Terranova | H04B 5/0012 |
| | | | 455/73 |
| 2007/0086274 A1* | 4/2007 | Nishimura | H04B 11/00 |
| | | | 367/140 |
| 2008/0076354 A1* | 3/2008 | Rofougaran | H04B 1/0458 |
| | | | 455/41.2 |
| 2010/0141051 A1 | 6/2010 | Vollaire | |
| 2010/0233296 A1* | 9/2010 | Benveniste | A61K 31/727 |
| | | | 424/682 |
| 2013/0035814 A1* | 2/2013 | Boyer | B60L 11/1816 |
| | | | 701/22 |
| 2014/0168019 A1* | 6/2014 | Hirobe | H01Q 1/38 |
| | | | 343/720 |
| 2014/0354360 A1* | 12/2014 | Hayashi | H03F 1/56 |
| | | | 330/261 |
| 2015/0115879 A1* | 4/2015 | Park | H02J 17/00 |
| | | | 320/108 |
| 2016/0142020 A1* | 5/2016 | Wang | H03F 1/0288 |
| | | | 330/295 |

* cited by examiner

WIRELESS POWER TRANSFER USING A MICROWAVE SIGNAL

BACKGROUND OF THE INVENTION

Wireless charging methods using, e.g., magnetic resonance, to transfer power over a relatively short distance (e.g., an inch) have become commonplace (e.g., cellphone charging pads). It would be useful to be able to transfer power wirelessly over a relatively long distance to allow the charging of batteries or the powering of equipment remote from a mains power source.

Accordingly, there is a need for wireless power transfer using a microwave signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a wireless power source. In one example, the wireless power source includes a microwave receiver, a matching network, and a transducer. The microwave receiver receives a microwave signal having a carrier frequency. The matching network receives a signal having the carrier frequency and a switched frequency and removes the carrier frequency such that the matching network outputs a switched signal at the switched frequency. The transducer receives the switched signal and outputs a DC voltage.

Another embodiment provides a method of generating power. In one example, the method includes generating a microwave signal at a carrier frequency, switching the microwave signal at a switched frequency, removing, by a receiver, the carrier frequency from the switched microwave signal to produce a switched signal, applying the switched signal to a transducer, and generating, by the transducer, a direct current voltage.

Figure 1:
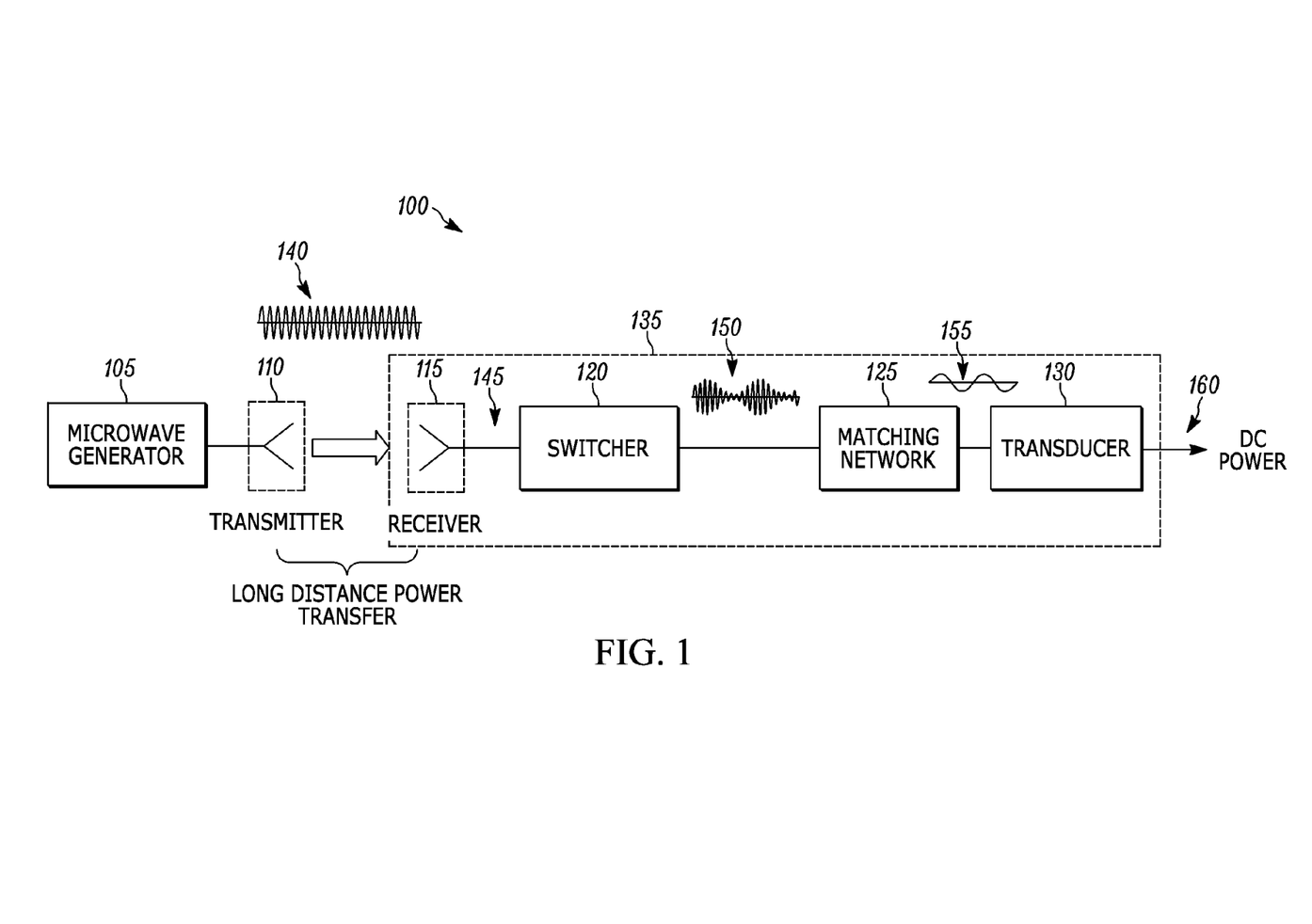
FIG. 1 is a schematic block diagram of a system for wirelessly transferring power over a long distance in accordance with some embodiments.

FIG. 1 is a schematic/block diagram of a system 100 for wirelessly transferring power over a long distance (e.g., greater than 10 feet). In the example illustrated, the system 100 includes a microwave generator 105, a microwave transmitter 110, a microwave receiver 115, a switcher 120, a matching network 125, and a transducer 130. The microwave transmitter 110, switcher 120, matching network 125, and transducer 130 form a wireless power source 135. The microwave generator 105 and microwave transmitter 110 can be a suitable device or devices capable of generating and transmitting microwave signals including, but not limited to, phase arrays, horns, dishes, and other antennae having high dBi (decibel isotropic). The microwave generator 105 and microwave transmitter 110 generates and wirelessly transmits a focused microwave beam 140. The focused microwave beam 140 has a frequency (e.g., in the gigahertz range) and inherently contains an amount of power. With regard to certain embodiments, the frequency of the focused microwave beam 140 is a carrier frequency.

The microwave receiver 115 receives the focused microwave beam 140 and converts the focused microwave beam 140 to an electronic microwave signal 145. The switcher 120 receives the electronic microwave signal 145 from the microwave receiver 115 and adds a frequency (e.g., in the megahertz range) to the carrier frequency using any suitable method (e.g., modulation, pulse-width-modulation, switching, etc.). The switcher 120 outputs a combined carrier/switched signal 150.

The matching network 125 receives the combined carrier/switched signal 150 and removes the carrier frequency, leaving a switched signal 155 which is output to the transducer 130. The transducer 130 receives the switched signal 155 and outputs a DC voltage 160 (e.g., 5 volts DC).

Figure 2:
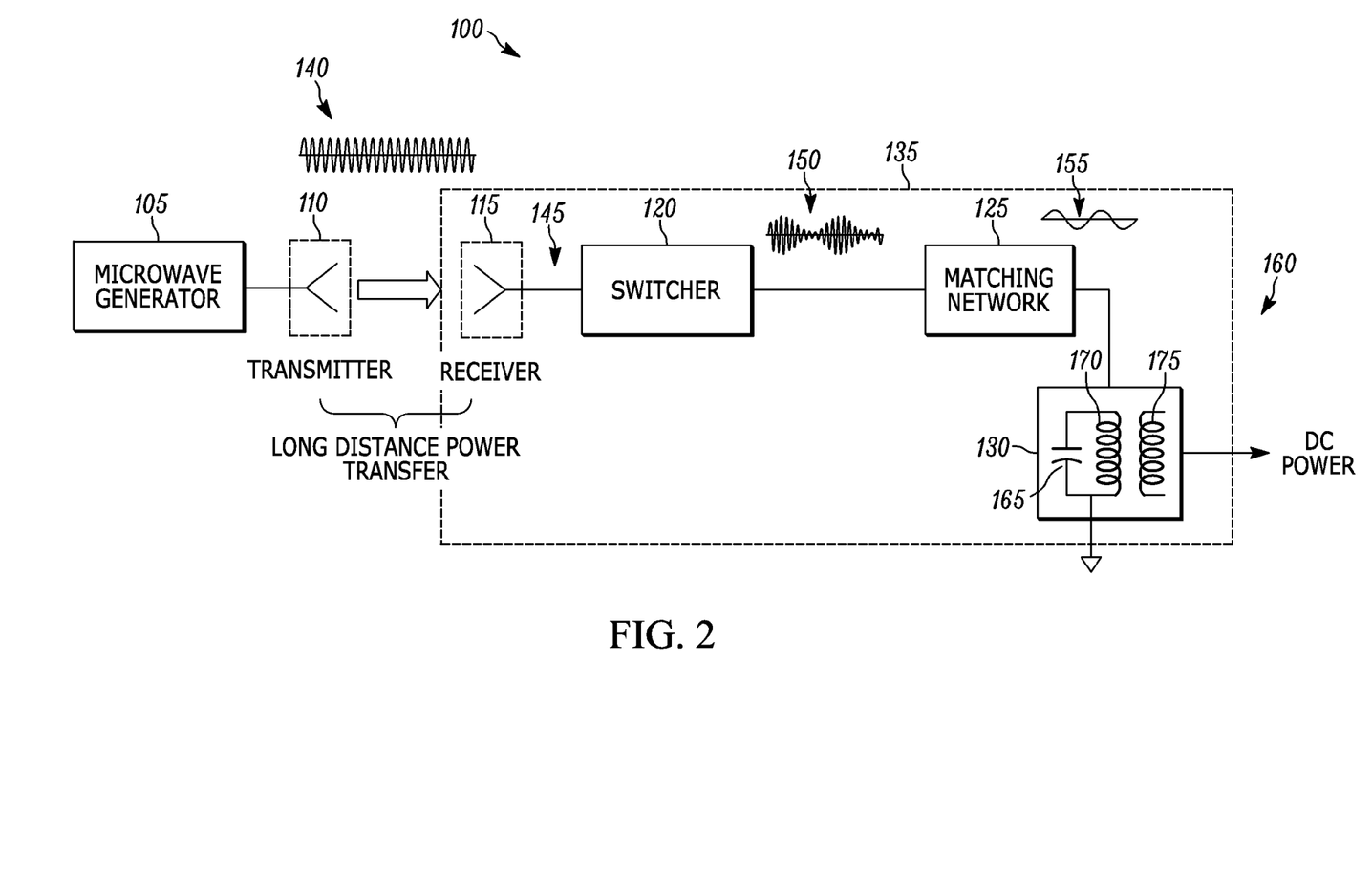
FIG. 2 is a schematic block diagram of the system of FIG. 1 incorporating a magnetic resonance transducer in accordance with some embodiments.

FIG. 2 is a schematic/block diagram of the system 100 of FIG. 1 where the transducer 130 is a magnetic resonance transducer that includes a capacitor 165, a first coil 170, and a second coil 175. The switched signal 155 is an electric signal with a switched frequency matching the resonant frequency of the first coil 170. Thus, when the switched signal 155 is applied to the first coil 170, a DC voltage is generated by the second coil 175.

Figure 2A:
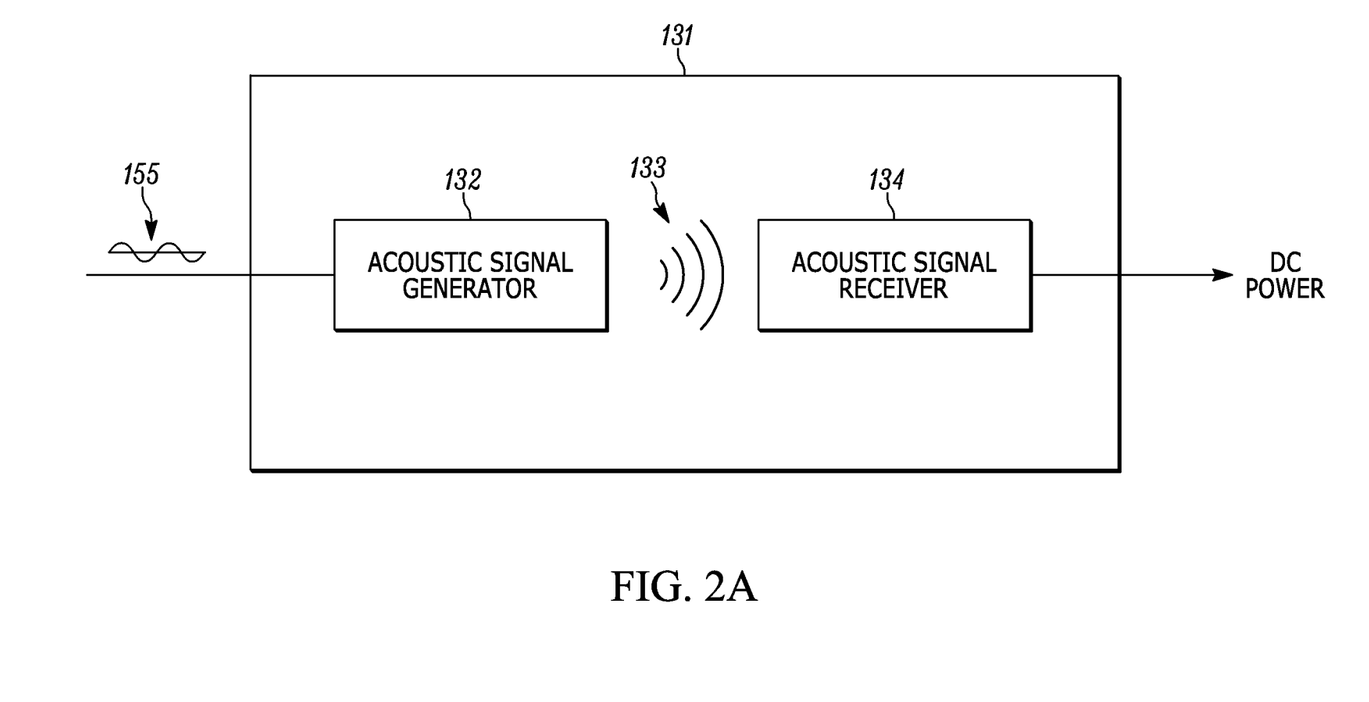
FIG. 2A is a schematic block diagram of an acoustic transducer in accordance with some embodiments.

FIG. 2A illustrates an alternative transducer, transducer 131. The switched signal 155 produced by the matching network 125 is received by an acoustic signal generator 132 which produces an acoustic signal 133 at the switched frequency. An acoustic signal receiver 134 receives the acoustic signal 133 and generates a DC voltage from the acoustic signal 133. The acoustic signal generator 132 and the acoustic signal receiver 134 are spaced a distance apart (e.g., several feet).

Figure 3:
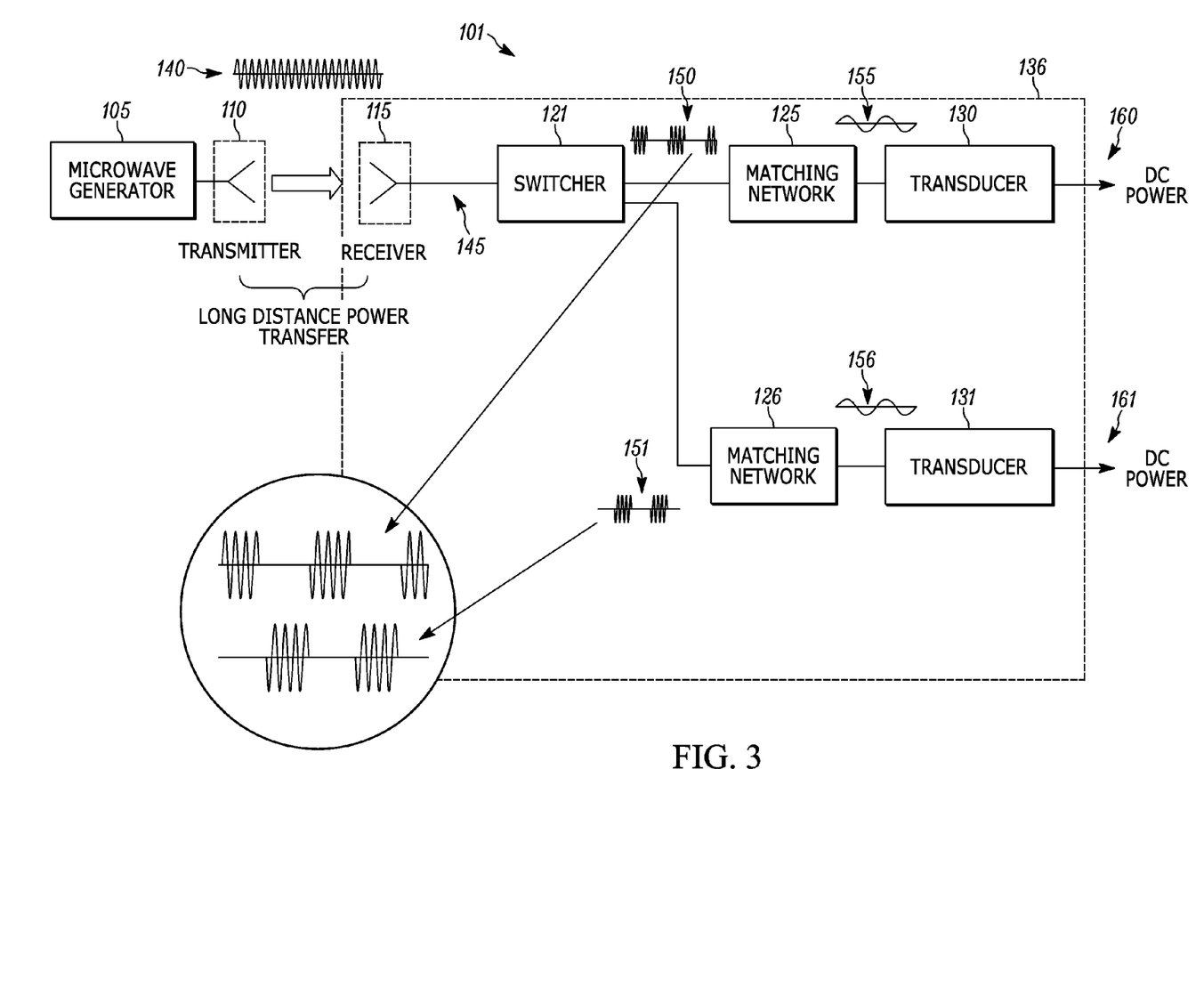
FIG. 3 is a schematic block diagram of an alternative embodiment of the system in which multiple direct current (DC) voltages are produced from a single focused microwave beam.

FIG. 3 illustrates an alternative embodiment. A system 101 produces multiple DC voltages 160 and 161 from a single focused microwave beam 140. A switcher 121 produces a first combined carrier/switched signal 150 and a second combined carrier/switched signal 151. As shown in the insert of FIG. 3, the first and second combined carrier/switched signals 150 and 151 each utilize half (50%) of the focused microwave beam 140. Thus, more of the power in the focused microwave beam 140 is used by the system 101 to produce the DC voltages 160 and 161. Further alternatives are possible, such as dividing the focused microwave beam 140 into even smaller signals. Each of the combined carrier/switched signals 150 and 151 are received by matching networks 125 and 126 respectively. Each matching network 125 and 126 produce a switched signal 155 and 156 which are fed to a magnetic resonant transducer 130 and an acoustic transducer 131 to produce the DC voltages 160 and 161.

Figure 4:
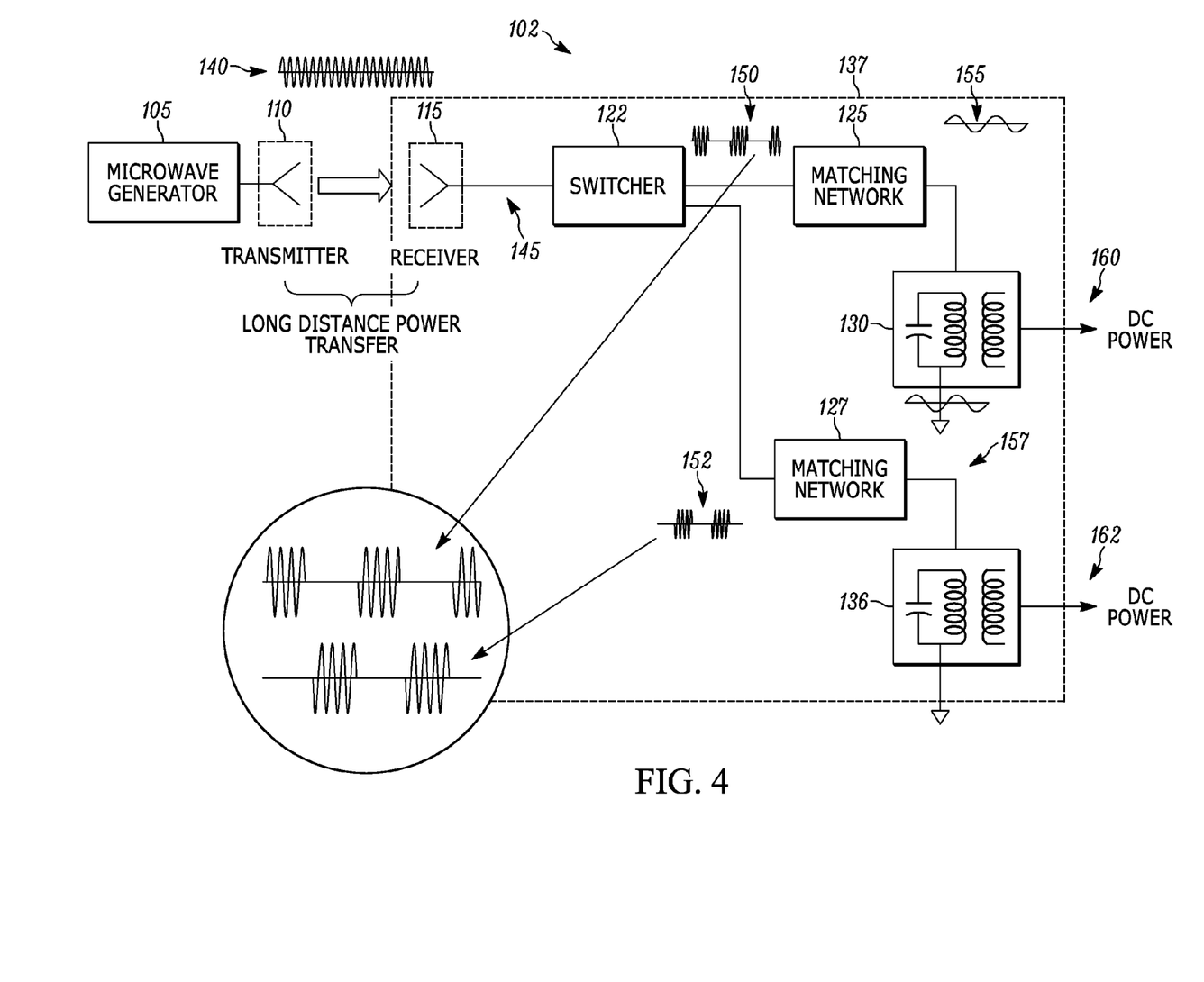
FIG. 4 is a schematic block diagram of the system of FIG. 3 in which multiple DC voltages are produced from a single focused microwave beam using magnetic resonance transducers.

FIG. 4 illustrates another alternative embodiment. A system 102 produces first and second DC voltages 160 and 162 from a single focused microwave beam 140. A switcher 122 produces a first combined carrier/switched signal 150 and a second combined carrier/switched signal 152. As shown in the insert of FIG. 4, the first and second combined carrier/switched signals 150 and 152 each utilize half (50%) of the focused microwave beam 140. Thus, more of the power in the focused microwave beam 140 is used by the system 102 to produce the DC voltages 160 and 162. Further alternatives are possible, such as dividing the focused microwave beam 140 into even smaller signals. Each of the combined carrier/switched signals 150 and 152 are received by first and second matching networks 125 and 127 respectively. Each matching network 125 and 127 produce a first and second switched signal 155 and 157 (having first and second switched frequencies which may be the same or different) which are fed to first and second magnetic resonant transducers 130 and 136 to produce the DC voltages 160 and 162.

As discussed above with respect to system 100, embodiments can incorporate a variety of transducers or combinations of transducers (e.g., the magnetic resonant transducer 130 and the acoustic transducer 131).

Figure 5:
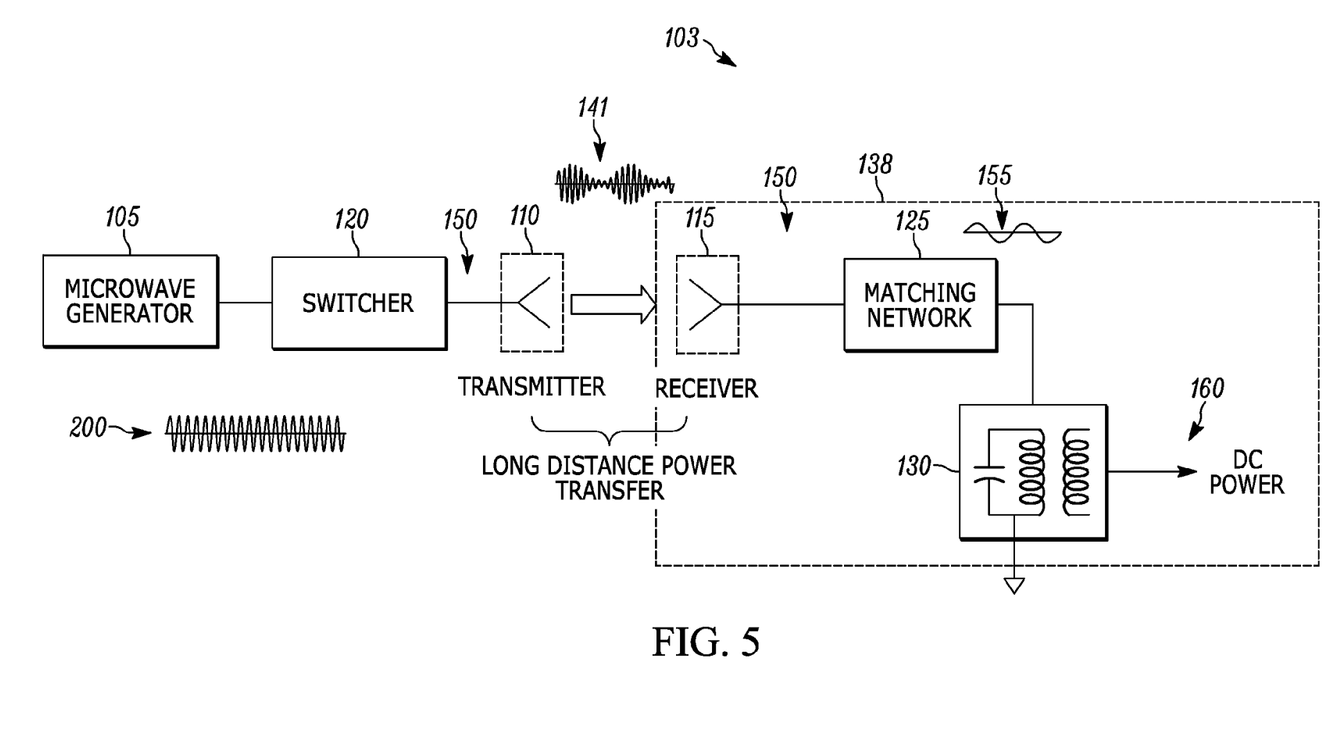
FIG. 5 is a schematic block diagram of a system for wirelessly transferring power over a relatively long distance in accordance with some embodiments.

FIG. 5 illustrates an alternate embodiment of the system 103 in which the switcher 120 receives an electronic microwave signal 200 from the microwave generator 105 directly. Thus, the microwave transmitter 110, matching network 125, and transducer 130 form a wireless power source 138. The switcher 120 adds the switched frequency to the carrier frequency of the microwave signal 200 and sends the combined carrier/switched signal 150 to the microwave transmitter 110. A focused microwave beam 141 contains the combined carrier/switched signal and is received by the microwave receiver 115. The microwave receiver 115 provides the combined carrier/switched signal to the matching network 125 which strips the carrier frequency away and provides the switched signal 155 to the transducer 130. The configuration shown in FIG. 5 is applicable to all of the alternative embodiments discussed above (e.g., the multiple DC output system 101 of FIG. 3).

Figure 6:
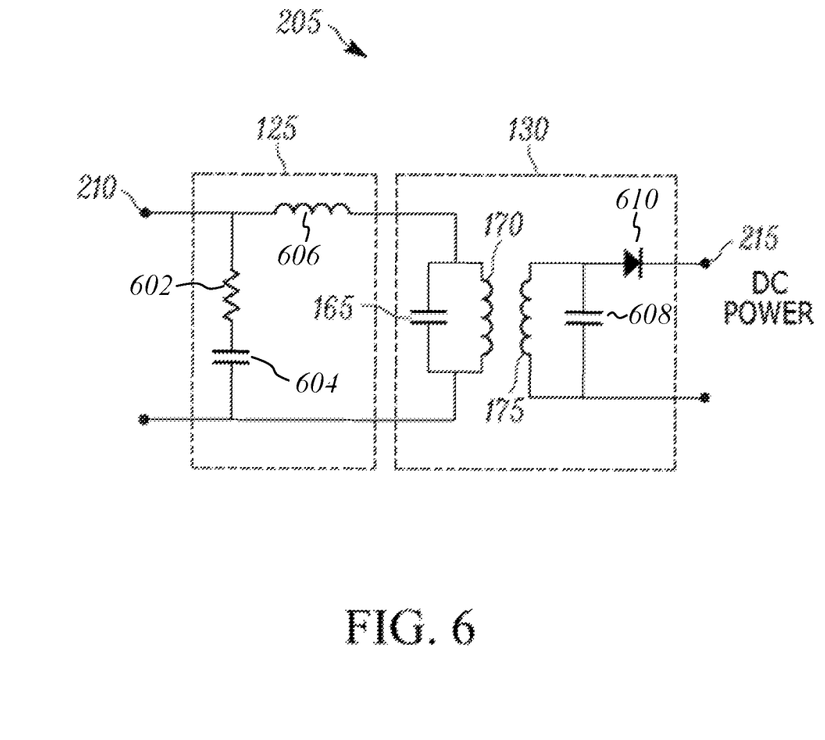
FIG. 6 is a schematic diagram of an example matching network/transducer in accordance with some embodiments.

FIG. 6 is a schematic of an example circuit 205 for the matching network 125 and transducer 130 of FIG. 2. The circuit 205 receives the combined carrier/switched signal 150 at a first terminal 210. In the circuit shown, the components, a resistor 602, an inductor 606, and a capacitor 608 are chosen for a combined carrier/switched signal 150 having a carrier frequency of 5-6 gigahertz (GHz) and a switched frequency of 6.8 megahertz (MHz). These ranges are non-limiting and can be any suitable frequency. The matching network 125 strips the carrier frequency off of the combined carrier/switched signal 150 and a transducer coil 170 has a resonant frequency of 6.8 MHz. The circuit 205 outputs a DC voltage at a second terminal 215 when a combined carrier/switched signal 150 having a carrier frequency of 5-6 GHz and a switched frequency of 6.8 MHz is received at the first terminal 210. The transducer 130 includes a capacitor 608 and a diode 610.

The above are examples and the invention can use other suitable combinations of the matching network 125 and the transducer 130 to produce a DC voltage.

Thus, the invention provides, among other things, a wireless power source capable of generating a DC voltage from a focused microwave beam received from a remote location.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless power source, the wireless power source comprising:
    a microwave receiver to receive a microwave signal having a carrier frequency;
    a matching network to receive a signal having the carrier frequency and a switched frequency and to remove the carrier frequency such that the matching network outputs a switched electronic signal at the switched frequency; and
    a transducer, having a first coil and a second coil, to receive the switched electronic signal and output a DC voltage.

2. The wireless power source of claim 1, further comprising a switcher to receive the microwave signal from the microwave receiver, adds the switched frequency to the microwave signal, and outputs a combined carrier/switched signal.

3. The wireless power source of claim 2, wherein the switcher adds a second switched frequency to the microwave signal and outputs a second combined carrier/switched signal.

4. The wireless power source of claim 3, further comprising a second matching network which receives the second combined carrier/switched signal from the switcher, the second combined carrier/switched signal having the carrier frequency and the second switched frequency and removes the carrier frequency such that the second matching network outputs a second signal at the second switched frequency; and
    a second transducer configured to receive the second signal and output a second DC voltage.

5. The wireless power source of claim 1, wherein the microwave signal includes the switched frequency.

6. The wireless power source of claim 1, further comprising a second matching network to receive a second combined carrier/switched signal having the carrier frequency and a second switched frequency and to remove the carrier frequency such that the matching network outputs a second signal at the second switched frequency; and
    a second transducer configured to receive the second signal and output a second DC voltage.

7. A method of wireless power transfer, the method comprising:
    generating a microwave signal at a carrier frequency;
    switching the microwave signal at a switched frequency;
    removing, by a receiver, the carrier frequency from the switched microwave signal to produce a switched electronic signal;
    applying the switched electronic signal to a transducer having a first coil and a second coil; and
    generating, by the transducer, a direct current voltage.

8. The method of claim 7, wherein the microwave signal is switched in the receiver.

9. The method of claim 7, further comprising transmitting the switched microwave signal wirelessly to the receiver.

10. The method of claim 7, further comprising
    switching the microwave signal at a second switched frequency;
    removing, by the receiver, the carrier frequency from the switched microwave signal to produce a second signal;
    applying the second signal to a second transducer; and
    generating, by the second transducer, a second direct current voltage.

11. The method of claim 10, wherein the receiver adds the second switched frequency to the microwave signal.

12. The method of claim 10, wherein the second transducer includes a first coil and a second coil.

13. The method of claim 10, wherein the second transducer is an acoustic transducer.

* * * * *